US006651374B1

United States Patent
Ridlen

(10) Patent No.: US 6,651,374 B1
(45) Date of Patent: Nov. 25, 2003

(54) FISHING ROD HOLDER

(76) Inventor: Robert L. Ridlen, 686 Buckley Way, Aurora, CO (US) 80011-4535

( * ) Notice: Subject to any disclaimer, the term of this patent is extended or adjusted under 35 U.S.C. 154(b) by 0 days.

(21) Appl. No.: 10/223,092

(22) Filed: Aug. 19, 2002

(51) Int. Cl.[7] ............................................. A01K 97/10
(52) U.S. Cl. ...................................... 43/21.2; 248/514
(58) Field of Search ........................... 43/21.2; 248/530, 248/532, 540, 545, 520, 528, 188.5, 188.6, 514

(56) References Cited

U.S. PATENT DOCUMENTS

| 358,527 A | | 3/1887 | Zwoyer et al. | |
|---|---|---|---|---|
| 420,592 A | | 2/1890 | Dayton | |
| 1,025,657 A | | 5/1912 | Towne | |
| 2,003,535 A | * | 6/1935 | Haskin | 248/538 |
| 2,199,034 A | * | 4/1940 | Witczak | 248/514 |
| 2,384,710 A | * | 9/1945 | Trippensee | 248/188.5 |
| 2,438,388 A | * | 3/1948 | Dolk | 248/532 |
| 2,466,166 A | * | 4/1949 | Fischer | 248/533 |
| 2,645,050 A | * | 7/1953 | Golias | 43/17 |
| 2,752,115 A | * | 6/1956 | Green | 248/533 |
| 2,924,414 A | * | 2/1960 | Tesdal | 248/165 |
| 3,204,899 A | * | 9/1965 | Danielewicz | 248/514 |
| 3,484,066 A | * | 12/1969 | Aunspaugh | 248/541 |
| 3,570,793 A | * | 3/1971 | Shackel | 248/515 |
| 3,636,649 A | * | 1/1972 | Paiva | 43/21.2 |
| 4,150,733 A | * | 4/1979 | Plummer | 182/187 |
| 4,677,784 A | | 7/1987 | Butkus | |
| 4,854,069 A | * | 8/1989 | Smith et al. | 43/21.2 |
| 4,972,621 A | * | 11/1990 | Tucker | 43/21.2 |
| 5,349,775 A | | 9/1994 | Mondares | |
| 5,367,815 A | * | 11/1994 | Liou | 43/21.2 |
| D365,870 S | | 1/1996 | Miller | |
| 5,632,112 A | * | 5/1997 | Steinborn | 43/21.2 |
| 5,819,720 A | * | 10/1998 | Schubert | 126/41 R |

FOREIGN PATENT DOCUMENTS

FR     2557423 A1 * 7/1985 .......... A01K/97/10

* cited by examiner

*Primary Examiner*—Michael J. Carone
*Assistant Examiner*—Joan M. Olszewski
(74) *Attorney, Agent, or Firm*—Donald R. Schoonover

(57) ABSTRACT

A fishing rod holder includes adjustable legs that are moveably attached to a housing and which include telescoping sections and an anchor unit that is telescopingly mounted on the housing. Rod clamp units attach a fishing rod to the housing.

2 Claims, 2 Drawing Sheets

FISHING ROD HOLDER

BACKGROUND OF THE INVENTION

1. Field of the Invention

The present invention relates to the general art of fishing, and to the particular field of fishing accessories.

2. Discussion of the Related Art

Fishing is an extremely popular sport and pastime. More and more people are fishing than ever before. As such, the art of fishing has exploded with numerous inventions. These inventions are generally directed to making fishing more convenient, efficient, and enjoyable.

One area of interest has been the support of a fishing rod. For numerous reasons, a fisherman may want, or require, an accessory to hold the fishing rod for him. This situation often occurs when the fisherman has more than one rod active at the same time. Thus, the fishing art contains several devices that are intended to support a fishing rod for the fisherman.

While somewhat successful, these devices have not met with a great deal of commercial success because they are often difficult to use. That is, they may be cumbersome to store, difficult to set up, difficult to knock down and prone to failure. If a device is difficult to use, the fisherman is likely to avoid it as many such devices are sometimes used in difficult conditions. For example, the fisherman may be on a steep bank with a great deal of growth and a great deal of mud. If the rod holder is difficult to deploy, the conditions may make it even more difficult and thus the fisherman will not use the device. Still further, if the rod holder causes the fishing rod to engage the ground or surrounding items, the rod may become dirty while being held by the rod holder. Again, the fisherman may avoid using such a device.

Therefore, there is a need for a fishing rod holder that can be conveniently stored when not in use.

Fishermen generally have a great deal of gear to carry with them. While most fishermen can handle this situation, it is exacerbated by difficult terrain and a fisherman is not likely to want additional gear to carry if he or she can avoid it. Thus, if a rod holder is cumbersome to carry and store, it is likely to be avoided by many fishermen.

Therefore, there is a need for a fishing rode holder that can be conveniently stored when not in use.

If the fishing is being conducted in rugged terrain, the fisherman is likely to be loathe to execute complicated or difficult maneuvers, especially maneuvers associated with deploying equipment intended to make his or her task easier. Thus, if it is difficult or cumbersome to deploy a fishing rod holder, it is likely that the fisherman will avoid such an accessory. In some instances, it may be necessary to quickly deploy the fishing rod holder. Again, if it is difficult to deploy such equipment, it will not be used.

Therefore, there is a need for a fishing rod holder that is expeditiously deployed when necessary.

Once a fishing rod is supported by a fishing rod holder, the rod must be stable. If the rod is not stable, it can fall over and defeat the purpose of the rod holder. This is especially true if the rod holder must be used in muddy or very uneven terrain. If a fisherman places his or her fishing rod on a rod holder in order to keep it supported and out of the mud and the rod holder is likely to fall over or permit the rod to contact the mud, the fisherman is also likely to avoid using the rod holder.

Therefore, there is a need for a fishing rod holder that is stable when deployed and which supports the fishing rod in a manner that prevents the rod from engaging mud or the like.

As mentioned above, many fisherman encounter a wide variety of situations for fishing the various species of fish. If equipment can only be used in only a limited number of situations, a fisherman is not likely to purchase it as there is already too much equipment available. Therefore, most fishing accessories should be as versatile and adaptable as possible.

Therefore, there is a need for a fishing rod holder that can be used in a variety of situations.

PRINCIPAL OBJECTS OF THE INVENTION

It is a main object of the present invention to provide a fishing rod holder that is easy to use.

It is another object of the present invention to provide a fishing rod holder that can be conveniently stored when not in use.

It is another object of the present invention to provide a fishing rod holder that is expeditiously deployed when necessary.

It is another object of the present invention to provide a fishing rod holder that is stable when deployed.

It is another object of the present invention to provide a fishing rod holder that can be used in a variety of situations.

It is another object of the present invention to provide a fishing rod holder that will support the fishing rod in a manner that prevents the rod from engaging mud or the like.

SUMMARY OF THE INVENTION

These, and other, objects are achieved by a fishing rod holder which comprises a base unit which includes a housing having a first end, a second end, a first surface, a second surface and a bore defined therein from the second end toward the first end; a fishing rod securing unit which includes a rod securing unit located adjacent to the first end of the housing and which has a rod clamp and a fastener, a rod handle securing unit located on the first surface of the housing of the base unit and spaced apart from the rod securing unit toward the second end of the housing and which includes a clamp and a fastener; an anchor unit which includes an anchor blade telescopingly mounted on the housing of the base unit to slide into and out of the bore defined in the housing of the base unit; and a leg unit which includes two legs attached to the housing of the base unit and movable between a first position extending away from the housing of the base unit and a second position adjacent to the sides of the housing of the base unit and extending in the direction of the sides of the housing of the base unit from the first end of the housing toward the second end of the housing of the base unit, each leg unit including a first leg section attached to the housing and a second leg section telescopingly attached to the first leg section and a lock releasably attaching the first leg section to the second leg section when the lock is activated.

The fishing rod holder can be easily attached to a fishing rod and can remain in place for as long as desired and stored on the fishing rod when not in use to be ready for use when necessary. The holder is easily deployed so the fisherman can easily and quickly support the fishing rod when desired, yet the holder is easily and quickly stored in a very convenient location so the holder can be placed out of the way when desired. Furthermore, the holder is very stable and versatile so it can be used in a wide variety of situations.

BRIEF DESCRIPTION OF THE DRAWING FIGURES

DETAILED DESCRIPTION OF THE INVENTION

Other objects, features and advantages of the invention will become apparent from a consideration of the following detailed description and the accompanying drawings.

Figure 4:
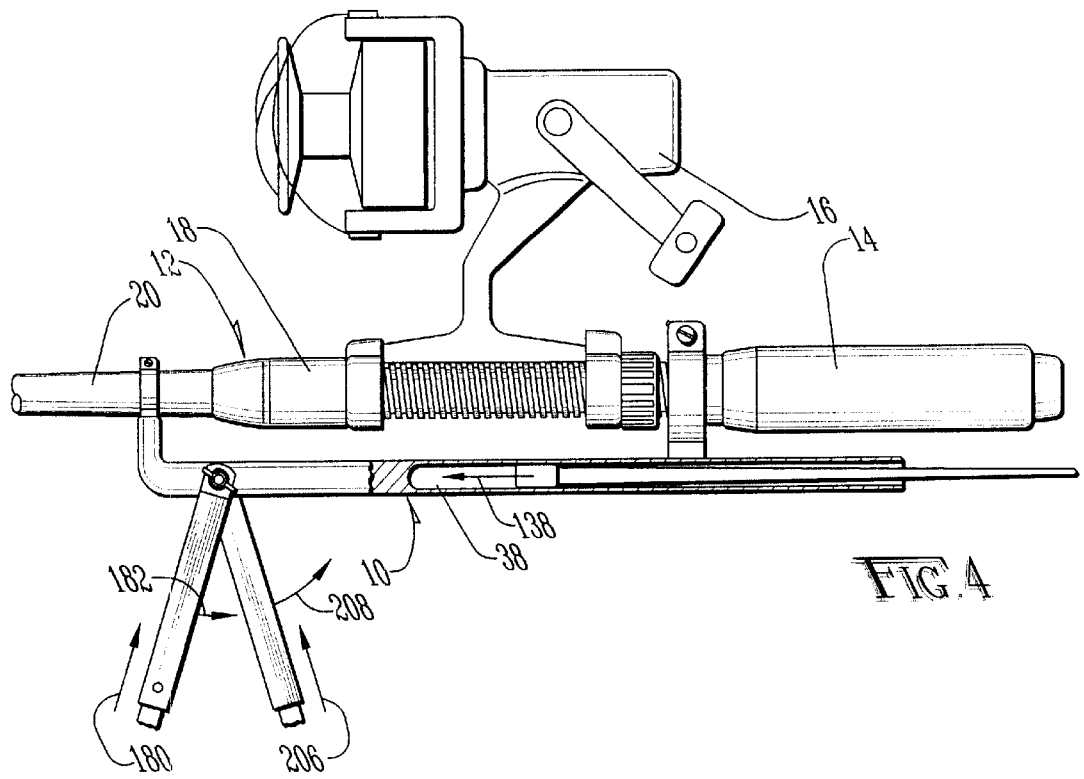
FIG. 4 is a side elevational view of the fishing rod holder embodying the present invention in combination with a fishing rod.

Referring to FIG. 4, it can be seen that the present invention is embodied in a fishing rod holder 10 that stably supports a fishing rod 12 yet can be easily and expeditiously stored and deployed. As shown in FIG. 4, the fishing rod includes a handle/butt grip 14 on one end of a reel unit 16 with a foregrip 18 on the other end of the reel unit 16. A blade 20 is partially shown in FIG. 4. Rod holder 10 is releasably attached to the fishing rod 12 and can be stored on the rod 12 in a manner that keeps it out of the way when it is being stored, yet will permit easy and expeditious deployment of the holder 10 into a stable rod supporting orientation when necessary.

Figure 1:
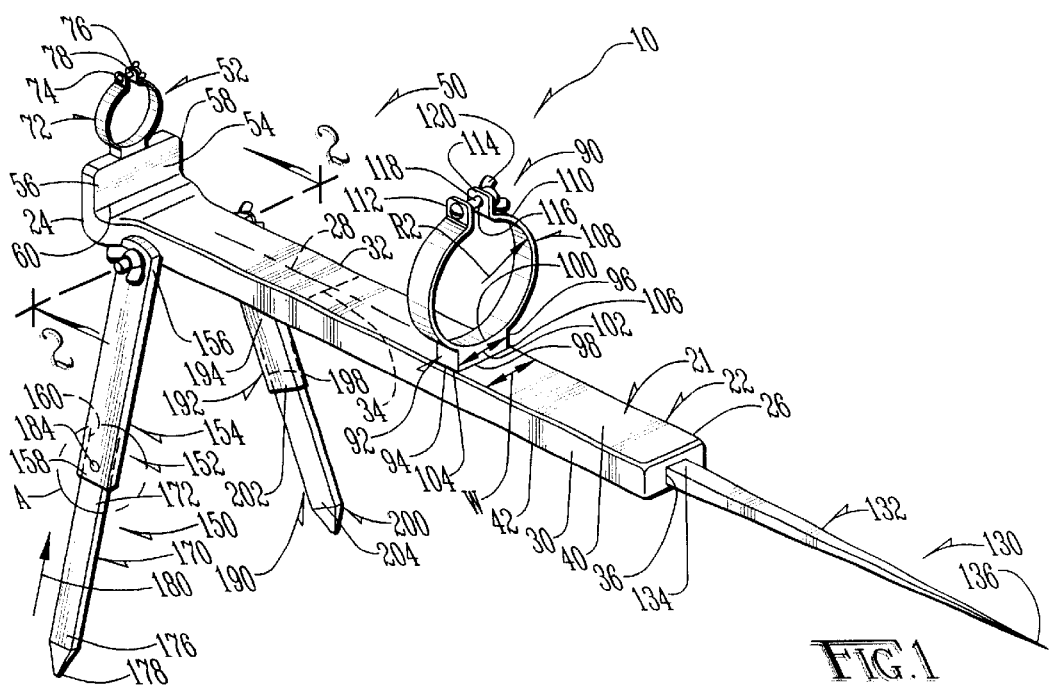
FIG. 1 is a perspective view of a fishing rod holder embodying the present invention.
Figure 2:
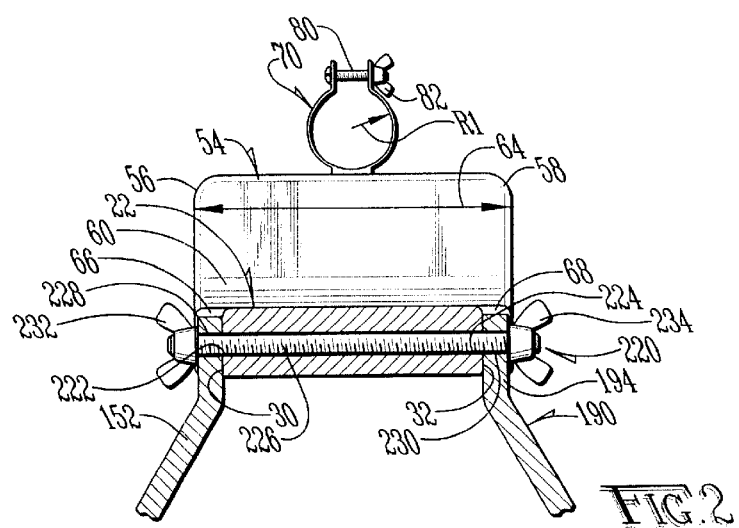
FIG. 2 is a view taken along line 2—2 of FIG. 1.
Figure 3:
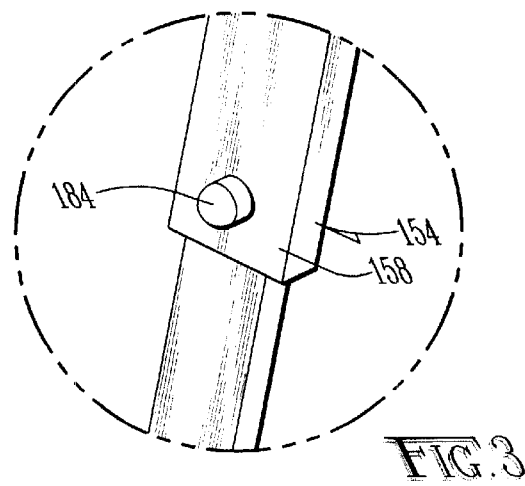
FIG. 3 is a detail view of detail A of FIG. 1.

Referring to FIGS. 1–3, it can be understood that the present invention is embodied in fishing rod holder 10 which comprises a base unit 21 which includes a housing 22 having a first end 24, a second end 26, and a longitudinal axis 28 extending between the first end 24 and the second end 26. Housing 22 further includes a first side 30, a second side 32, a transverse axis 34 extending between the first side 30 and the second side 32, and a width dimension W extending along the transverse axis 34 from the first side 30 of the housing 22 to the second side 32 of the housing 22. A hole 36 is defined through the second end 26 of the housing 22 and a hollow bore 38 (see FIG. 4) extends in the direction of the longitudinal axis 28 from the second end 26 of the housing 22 toward the first end 24 of the housing 22. Housing 22 further includes a first surface 40, which is a top surface when the rod holder is in a set-up configuration, and a second surface 42.

The rod holder 10 of the present invention further includes a rod securing unit 50 which includes a rod blade clamp unit 52 on the first surface 40 of the housing 22 near the first end 24 of the housing 22. Rod blade clamp unit 52 includes a base 54 on the first surface 40 of the housing 22 and extends from the first surface 40 of the housing 22 upwardly when the rod holder 10 is in the set-up configuration. Base 54 includes a first end edge 56 located adjacent to the first side 30 of the housing 22, a second end edge 58 located adjacent to the second side 32 of the housing 22, a first side edge 60 located adjacent to the first surface 40 of the housing 22, and a second side edge 62 spaced apart from the first side edge 60 of the base 54 of the rod blade clamp 52. A width dimension 64 of the base 54 extends between the first side edge 60 of the base 54 and the second side edge 62 of the base 54. Width dimension 64 of the base is greater than a width dimension of the housing 22. A first shoulder 66 is defined between the first side edge 60 of the base 54 and the first side 30 of the housing 22, and a second shoulder 68 is defined between the second side edge 62 of the base 54 of the rod blade clamp unit 52 and the second side 32 of the housing 22. The shoulders 66, 68 are located adjacent to the first end 24 of the housing 22.

A rod clamp element 70 is mounted on the second side edge 62 of the base 54 and includes an arcuate clamp ring 72 having a radius of curvature R1 and is fixedly mounted on the second side edge 62 of the base 54. The clamp ring 72 including two spaced apart ends 74 and 76 with a fastener-receiving hole, such as hole 78, defined through each end 74, 76 of the arcuate clamp ring 72. A bolt 80 extends through the fastener-receiving holes 78 when the bolt 80 is in place, and a wing nut, such as wing nut 82, is positioned on the bolt 80 adjacent to each end 74, 76 of the clamp ring 72 when the bolt 80 is in place.

The rod securing unit 50 further includes a rod handle clamp unit 90 on the first surface 40 of the housing 22 spaced apart from the rod blade clamp unit 52 in the direction of the longitudinal axis 28 of the housing 22. The rod handle clamp unit 90 includes a base 92 on the first surface 40 of the housing 22. Base 92 extends from the first surface 40 of the housing 22 and includes a first end edge 94 located adjacent to the first side 30 of the housing 22, a second end edge 96 located adjacent to the second side 32 of the housing 22, a first side edge 98 located adjacent to the first surface 40 of the housing 22, a second side edge 100 spaced apart from the first side edge 98 of the base 92 of the rod handle clamp unit 90, and a width dimension 102 which extends between the first side edge 98 of the base 92 of the rod handle clamp unit 90 and the second side edge 100 of the base 92 of the rod handle clamp unit 90. Width dimension 102 of the base 92 of the rod handle clamp unit 90 is slightly smaller than width dimension W of the housing 22. A first shoulder 104 is defined between the first side edge 98 of the base 92 of the rod handle clamp unit 90 and the first side 30 of the housing 22 and a second shoulder 106 is defined between the second side edge 100 of the base 92 of the rod handle clamp unit 90 and the second side 32 of the housing 22. Shoulders 104 and 106 are located adjacent to base 92. A rod handle clamp unit 108 is mounted on the second side edge 100 of the base 92 of the rod handle clamp unit 90 and includes an arcuate clamp ring 110 having a radius of curvature R2 and which is fixedly mounted on the second side edge 100 of the base 92. The clamp ring 110 of the rod handle clamp unit 90 includes including two spaced apart ends 112 and 114.

A fastener-receiving hole, such as hole 116, is defined through each end 112, 114 of the arcuate clamp ring 110 of the rod handle clamp unit 90. A bolt 118 extends through the fastener-receiving holes 116 of the rod handle clamp unit 90 when the bolt 118 is in place, and a wing nut, such as wing nut 120, is located on the bolt 118 of the rod handle clamp unit 90 adjacent to each end 112, 114 of the clamp ring 110 of the rod handle clamp unit 90 when the bolt 118 is in place.

Rod holder 10 further includes a telescoping anchor unit 130 which includes an anchor blade 132 which has a proximal end 134 located adjacent to the second end 26 of the housing 22 of the base unit 21 and a distal end 136. The anchor blade 132 is slidably mounted on the housing 22 of the base unit 21 and extends through the hole defined through the second end 26 of the housing 22 of the base unit 21. The anchor blade 132 is slidable into and out of the bore in the housing 22 of the base unit 21 between a first position, shown in FIG. 1, extending out of the housing 22 with the distal end 136 of the anchor blade 132 spaced apart from the second end 26 of the housing 22 of the base unit 21, and a second position, indicated in FIG. 4, with the distal end 136 of the anchor blade 132 located adjacent to the second end 26 of the housing 22 of the base unit 21 and the anchor blade 132 located inside the bore of the housing 22 of the base unit 21. The second position is not fully indicated in FIG. 4, but arrow 138 is included to indicate the direction of movement of the anchor blade 132 to the second position. The anchor blade 132 is fully inside the housing 22 in the second position with only enough of the anchor blade 132 extending out of the housing 22 to permit the anchor blade 132 to be grasped and pulled out toward the first position of the anchor blade 132 shown in FIG. 1.

The rod holder 10 further includes a leg unit 150 on the first end 24 of the housing 22 of the base unit 21. The leg unit 150 includes a first telescoping leg 152 located adjacent to the first side 30 of the housing 22 of the base unit 21. First leg 152 has a first leg section 154 which has a proximal end 156 located adjacent to the first side 30 of the housing 22 of the base unit 21 and adjacent to the first shoulder 66 defined between the first side edge 98 of the base 92 of the rod handle clamp unit 90 and the first side 30 of the housing 22 and a distal end 158 spaced from the proximal end 156 of the first leg section 154 of the first telescoping leg 152. A bore 160 is defined in the first leg section 154 and extends from the distal end 158 of the first leg section 154 toward the proximal end 156 of the first leg section 154 of the first telescoping leg 152. Telescoping leg 152 further includes a second leg section 170 which has a proximal end 172 located adjacent to the distal end 158 of the first leg section 154 of the first telescoping leg 152 and a distal end 176 spaced apart from the proximal end 172 of the second leg section 170 of the first telescoping leg 152. Distal end 176 may include a ground-engaging tip 178 to increase the stability of the rod holder 10 in the set-up configuration. Second leg section 170 of the first telescoping leg 152 is telescopingly mounted on first leg section 154 of the first telescoping leg 152 and moves between a first position shown in FIG. 1 in which the distal end 176 of the second leg section 170 of the first telescoping leg 152 is spaced apart from the distal end 158 of the first leg section 154 of the first telescoping leg 152, and a second position in which the distal end 176 of the second leg section 170 of the first telescoping leg 152 is located adjacent to the distal end 158 of the first leg section 154 of the first telescoping leg 154 and the second leg section 170 is accommodated in the bore 160 in the first leg section 154 of the first telescoping leg 152. Movement from the first position of the second leg section 170 of the first telescoping leg 152 from the first position to the second position is indicated in FIG. 1 by arrow 180. The telescoping leg can thus be adjusted to a desired height as well as closed for storage. The first telescoping leg 152 is also movable between a first position shown in FIG. 1 extending away from the first side 30 of the housing 22 of the base unit 21 and a second position extending in the direction of the longitudinal axis 28 of the housing 22 of the base unit 21 adjacent to the first side 30 of the housing 22 of the base unit 21. Movement of the telescoping leg from the first position to the second position is indicated in FIG. 4 by arrow 182. A lock 184 is mounted on the distal end 158 of the first leg section 154 of the first telescoping leg 152 and on the proximal end 172 of the second leg section 170 of the first telescoping leg 152. Lock 184 releasably locks the first leg section 154 of the first telescoping leg 152 to the second leg section 170 of the first telescoping leg 152 when the second leg section 170 of the first telescoping leg 152 is in the first position of the second leg section 170 of the first telescoping leg 152. Lock 184 can be a spring-loaded button or the like.

Rod holder 10 further includes a second telescoping leg 190 located adjacent to the second side 32 of the housing 22 of the base unit 21. Second telescoping leg 190 has a first leg section 192 which has a proximal end 194 located adjacent to the second side 32 of the housing 22 of the base unit 21 and adjacent to the second shoulder 68 defined between the second side edge 100 of the base 92 of the rod handle clamp unit 90 and the second side 32 of the housing 22. Section 192 has a distal end 196 spaced from the proximal end 194 of the first leg section 192 of the second telescoping leg 190 and a bore 198 defined in the first leg section 192 and which extends from the distal end 196 of the first leg section 192 of the second telescoping leg 190 toward the proximal end 194 of the second leg section 200 of the second telescoping leg 190.

A second leg section 200 has a proximal end 202 located adjacent to the distal end 196 of the first leg section 192 of the second telescoping leg 190 and a distal end 204 spaced apart from the proximal end 202 of the second leg section 200 of the second telescoping leg 190. The second leg section 200 of the second telescoping leg 190 is telescopingly mounted on the first leg section 192 of the second telescoping leg 190 and moves between a first position shown in FIG. 1 having the distal end 204 of the second leg section 200 of the second telescoping leg 190 spaced apart from the distal end 196 of the first leg section 192 of the second telescoping leg 190 and a second position with the distal end 204 of the second leg section 200 of the second telescoping leg 190 located adjacent to the distal end 196 of the first leg section 192 of the second telescoping leg 190 and the second leg section 200 being accommodated in the bore 198 in the first leg section 192 of the second telescoping leg 190. Movement from the first position to the second position is indicated in FIG. 4 by arrow 206.

Second telescoping leg 190 is movable between a first position shown in FIG. 1 extending away from the second side 32 of the housing 22 of the base unit 21 and a second position extending in the direction of the longitudinal axis 28 of the housing 22 of the base unit 21 adjacent to the second side 32 of the housing 22 of the base unit 21. Movement from the first position to the second position is indicated in FIG. 4 by arrow 208. A lock identical to lock 184 is located on the distal end 196 of the first leg section 192 of the second telescoping leg 190 and on the proximal end 202 of the second leg section 200 of the second telescoping leg 190 and releasably locks the first leg section 192 of the second telescoping leg 190 to the second leg section 200 of the second telescoping leg 190 when the second leg section 200 of the second telescoping leg 190 is in the first position of the second leg section 200 of the second telescoping leg 190.

A fastener unit 220 releasably attaches the first telescoping leg 152 and the second telescoping leg 190 to the housing 22 of the base unit 21. Fastener unit 220 includes aligned holes 222 and 224 defined through the first side 30 and the second side 32 of the housing 22 of the base unit 21 adjacent to the first end 24 of the housing 22 of the base unit 21. A threaded bolt 226 extends through the aligned holes 222, 224 defined through the first side 30 and second side 32 of the housing 22. A bolt receiving hole 228 is defined through the proximal end 156 of the first leg section 154 of the first telescoping leg 152, and a bolt receiving hole 230 is defined through the proximal end 194 of the first leg section 192 of the second telescoping leg 190. The threaded bolt 226 extends through the aligned holes on the housing 22 of the base unit 21 and through the holes 222, 224 defined through the proximal ends 156, 194 of the first leg sections 154, 192 of the first and second telescoping legs 152, 190 when the fastener unit 220 is in position on the housing 22. A first wing nut 232 is threadably mounted on the bolt adjacent to the proximal end 156 of the first leg section 154 of the first telescoping leg 152 when the fastener unit 220 is in position on the housing 22 and a second wing nut 234 is threadably mounted on the bolt adjacent to the proximal end 194 of the first leg section 192 of the second telescoping leg 190 when the fastener unit 220 is in position on the housing 22.

Operation of the rod holder 10 can be understood from the foregoing. The rod holder 10 can be attached to a fishing rod 12 and stored thereon with the anchor blade 132 in the second position and the telescoping legs 152, 190 in the second position and the second leg sections 170, 200 of the telescoping legs 152, 190 in the second positions. To deploy the rod holder 10, the telescoping legs 152, 190 are moved into the first position and the anchor blade 132 is moved into the first position and the second sections 170, 200 of the telescoping legs 152, 190 are moved into the first positions. The fishing rod 12 will thus be held in the manner indicated in FIG. 4. The height and angle of the rod 12 can be adjusted by moving the legs and anchor blade 132 as required. The rod holder 10 is moved back into the stored configuration by reversing the just-described process.

It is understood that while certain forms of the present invention have been illustrated and described herein, it is not to be limited to the specific forms or arrangements of parts described and shown.

What is desired to be covered by Letters Patent is:
1. A fishing rod holder comprising:
 a) a base unit which includes a housing having
  (1) a first end,
  (2) a second end,
  (3) a longitudinal axis extending between the first end and the second end,
  (4) a first side,
  (5) a second side,
  (6) a transverse axis extending between the first side and the second side,
  (7) a width dimension extending along the transverse axis from the first side of the housing to the second side of the housing,
  (8) a hole defined through the second end of the housing,
  (9) a hollow bore extending in the direction of the longitudinal axis from the second end of the housing toward the first end of the housing,
  (10) a first surface, and
  (11) a second surface;
 b) a rod securing unit which includes
  (1) a rod blade clamp unit on the first surface of the housing near the first end of the housing, the rod blade clamp unit including
   (A) a base on the first surface of the housing and extending from the first surface of the housing, the base including
    (i) a first end edge located adjacent to the first side of the housing,
    (ii) a second end edge located adjacent to the second side of the housing,
    (iii) a first side edge located adjacent to the first surface of the housing,
    (iv) a second side edge spaced apart from the first side edge of the base of the rod blade clamp,
    (v) a width dimension extending between the first side edge of the base and the second side edge of the base, the width dimension of the base being greater than the width dimension of the housing,
    (vi) a first shoulder defined between the first side edge of the base and the first side of the housing, and
    (vii) a second shoulder defined between the second side edge of the base of the rod blade clamp unit and the second side of the housing,
   (B) a rod clamp element mounted on the second side edge of the base and including
    (i) an arcuate clamp ring having a radius of curvature and fixedly mounted on the second side edge of the base of the clamp ring including two spaced apart ends,
    (ii) a fastener-receiving hole defined through each end of the arcuate clamp ring,
    (iii) a bolt extending through the fastener-receiving holes when the bolt is in place, and
    (iv) a wing nut on the bolt adjacent to each end of the clamp ring when the bolt is in place,
  (2) a rod handle clamp unit on the first surface of the housing spaced apart from the rod blade clamp unit in the direction of the longitudinal axis of the housing, the rod handle clamp unit including
   (A) a base on the first surface of the housing and extending from the first surface of the housing, the base of the rod handle clamp unit including
    (i) a first end edge located adjacent to the first side of the housing,
    (ii) a second end edge located adjacent to the second side of the housing,
    (iii) a first side edge located adjacent to the first surface of the housing,
    (iv) a second side edge spaced apart from the first side edge of the base of the rod handle clamp unit,
    (v) a width dimension extending between the first side edge of the base of the rod handle clamp unit and the second side edge of the base of the rod handle clamp unit, the width dimension of the base of the rod handle clamp unit being slightly smaller than the width dimension of the housing,
    (vi) a first shoulder defined between the first side edge of the base of the rod handle clamp unit and the first side of the housing, and
    (vii) a second shoulder defined between the second side edge of the base of the rod handle clamp unit and the second side of the housing, and
   (B) a rod handle clamp element mounted on the second side edge of the base of the rod handle clamp unit and including
    (i) an arcuate clamp ring having a radius of curvature and fixedly mounted on the second side edge of the base of the clamp ring of the rod handle clamp unit and including two spaced apart ends,
    (ii) a fastener-receiving hole defined through each end of the arcuate clamp ring of the rod handle clamp unit,
    (iii) a bolt extending through the fastener-receiving holes of the rod handle clamp unit when the bolt is in place, and
    (iv) a wing nut on the bolt of the rod handle clamp unit adjacent to each end of the clamp ring of the rod handle clamp unit when the bolt is in place;
 c) a telescoping anchor unit which includes an anchor blade having a proximal end located adjacent to the second end of the housing of said base unit, a distal end, the anchor blade being slidably mounted on the housing of said base unit and extending through the hole defined through the second end of the housing of said base unit, the anchor blade being slidable into and out of the bore in the housing of said base unit between a first position extending out of the housing with the distal end of the anchor blade spaced apart from the second end of the housing of said base unit and a second position with the distal end of the anchor blade located adjacent to the second end of the housing of said base unit and the anchor blade located inside the bore of the housing of said base unit;

d) a leg unit on the first end of the housing of said base unit and including
  (1) a first telescoping leg located adjacent to the first side of the housing of said base unit and having
    (A) a first leg section which has a proximal end located adjacent to the first side of the housing of said base unit and adjacent to the first shoulder defined between the first side edge of the base of the rod handle clamp unit and the first side of the housing and a distal end spaced from the proximal end of the first leg section of the first telescoping leg and a bore defined in the first leg section and extending from the distal end of the first leg section toward the proximal end of the first leg section of the first telescoping leg,
    (B) a second leg section which has a proximal end located adjacent to the distal end of the first leg section of the first telescoping leg, and a distal end spaced apart from the proximal end of the second leg section of the first telescoping leg,
    (C) the second leg section of the first telescoping leg being telescopingly mounted on the first leg section of the first telescoping leg and moving between a first position having the distal end of the second leg section of the first telescoping leg spaced apart from the distal end of the first leg section of the first telescoping leg and a second position with the distal end of the second leg section of the first telescoping leg located adjacent to the distal end of the first leg section of the first telescoping leg and the second leg section being accommodated in the bore in the first leg section of the first telescoping leg,
    (D) the first telescoping leg being movable between a first position extending away from the first side of the housing of said base unit and a second position extending in the direction of the longitudinal axis of the housing of said base unit adjacent to the first side of the housing of said base unit, and
    (E) a lock on the distal end of the first leg section of the first telescoping leg and on the proximal end of the second leg section of the first telescoping leg and releasably locking the first leg section of the first telescoping leg to the second leg section of the first telescoping leg when the second leg section of the first telescoping leg is in the first position of the second leg section of the first telescoping leg,
  (2) a second telescoping leg located adjacent to the second side of the housing of said base unit and having
    (A) a first leg section which has a proximal end located adjacent to the second side of the housing of said base unit and adjacent to the second shoulder defined between the second side edge of the base of the rod handle clamp unit and the second side of the housing and a distal end spaced from the proximal end of the first leg section of the second telescoping leg and a bore defined in the first leg section and extending from the distal end of the first leg section of the second telescoping leg toward the proximal end of the second leg section of the second telescoping leg,
    (B) a second leg section which has a proximal end located adjacent to the distal end of the first leg section of the second telescoping leg, and a distal end spaced apart from the proximal end of the second leg section of the second telescoping leg,
    (C) the second leg section of the second telescoping leg being telescopingly mounted on the first leg section of the second telescoping leg and moving between a first position having the distal end of the second leg section of the second telescoping leg spaced apart from the distal end of the first leg section of the second telescoping leg and a second position with the distal end of the second leg section of the second telescoping leg located adjacent to the distal end of the first leg section of the second telescoping leg and the second leg section being accommodated in the bore in the first leg section of the second telescoping leg,
    (D) the second telescoping leg being movable between a first position extending away from the second side of the housing of said base unit and a second position extending in the direction of the longitudinal axis of the housing of said base unit adjacent to the second side of the housing of said base unit, and
    (E) a lock on the distal end of the first leg section of the second telescoping leg and on the proximal end of the second leg section of the second telescoping leg and releasably locking the first leg section of the second telescoping leg to the second leg section of the second telescoping leg when the second leg section of the second telescoping leg is in the first position of the second leg section of the second telescoping leg; and
  3) a fastener unit attaching the first telescoping leg and the second telescoping leg to the housing of said base unit, the fastener unit including
    (A) aligned holes defined through the first side and the second side of the housing of said base unit adjacent to the first end of the housing of said base unit,
    (B) a threaded bolt extending through the aligned holes defined through the first side and the second side of the housing,
    (C) a bolt receiving hole defined through the proximal end of the first leg section of the first telescoping leg, (D) a bolt receiving hole defined through the proximal end of the first leg section of the second telescoping leg, (E) the threaded bolt extending through the aligned holes on the housing of said base unit and through the holes defined through the proximal ends of the first leg sections of the first and second telescoping legs when said fastener unit is in position on the housing, (F) a first wing nut threadably mounted on the bolt adjacent to the proximal end of the first leg section of the first telescoping leg when said fastener unit is in position on the housing, and (G) a second wing nut threadably mounted on the bolt adjacent to the proximal end of the first leg section of the second telescoping leg when said fastener unit is in position on the housing.

2. The fishing rod holder as described in claim 1 wherein the distal end of the anchor blade of said anchor unit includes a ground-engaging tip.

* * * * *